US008635577B2

(12) United States Patent
Kazda et al.

(10) Patent No.: US 8,635,577 B2
(45) Date of Patent: Jan. 21, 2014

(54) TIMING REFINEMENT RE-ROUTING (75) Inventors: Michael Anthony Kazda, Poughkeepsie, NY (US); Zhuo Li, Cedar Park, TX (US); Gi-Joon Nam, Austin, TX (US); Ying Zhou, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/486,645

(22) Filed: Jun. 1, 2012

(65) Prior Publication Data
US 2013/0326458 A1 Dec. 5, 2013

(51) Int. Cl.
G06F 17/50 (2006.01)

(52) U.S. Cl.
USPC ........... 716/130; 716/126; 716/129; 716/131; 716/134; 716/139

(58) Field of Classification Search
USPC .................... 716/126, 129–131, 134, 139
See application file for complete search history.

(56) References Cited

U.S. PATENT DOCUMENTS

| | | | | |
|---|---|---|---|---|
| 4,615,011 | A * | 9/1986 | Linsker | 716/126 |
| 6,292,928 | B1 * | 9/2001 | Yamaguchi et al. | 716/113 |
| 6,415,427 | B2 * | 7/2002 | Nitta et al. | 716/129 |
| 6,480,997 | B1 * | 11/2002 | Tanaka | 716/119 |
| 7,231,626 | B2 | 6/2007 | Hoff et al. | |
| 7,506,289 | B1 | 3/2009 | Chapman | |
| 7,526,746 | B2 | 4/2009 | Zhang et al. | |
| 7,530,040 | B1 | 5/2009 | Balsdon et al. | |
| 7,962,876 | B2 | 6/2011 | Oh et al. | |
| 8,015,522 | B2 | 9/2011 | Wang et al. | |
| 2011/0055791 | A1 | 3/2011 | Gao | |

OTHER PUBLICATIONS

Alpert, Charles J. et al., "The Importance of Routing Congestion Analysis", DAC.COM Knowledge Center Article www.dac.com Design Automation Conference May 4, 2010 , 14 pages.
Chen, Huang-Yu , "Global and Detailed Routing", Electronic Design Automation: Synthesis, Verification, and Test (Systems on Silicon) Chapter 12 Mar. 12, 2009 , pp. 687-750.
Jarrod, Roy A. et al., "Seeing the Forest and the Trees: Steiner Wirelength Optimization in Placement", IEEE Transactions on Computer-Aided Design of Integrated Circuits and Systems vol. 26 , Issue: 4 Apr. 2007 , 32 pages.
Kuan-Hsien, Ho et al., "ECO Timing Optimization Using Spare Cells and Technology", IEEE Trans. on Computer-Aided Design of Integrated Circuits and Systems v.29, n5 May 2010 , pp. 697-710.
Li, Jin-Yih et al., "An Efficient Tile-Based ECO Router with Routing Graph Reduction and Enhanced Global Routing Flow", IEEE Transactions on Computer-Aided Design of Integrated Circuits and Systems Feb. 2007 , 8 pages.

* cited by examiner

Primary Examiner — Nghia Doan
(74) Attorney, Agent, or Firm — DeLizio Gilliam, PLLC (57) ABSTRACT A design tool can automatically improve timing of nets of a fully routed physical design solution. Nets of a netlist are evaluated against a plurality of re-routing criteria to identify the nets that satisfy at least one of the plurality of re-routing criteria. For each of the nets that satisfy at least one of the plurality of re-routing criteria: several operations are performed. The net is globally re-routed to determine a new global route for the net. Those of the nets that are within a given distance of the new global route are identified. The net is detail re-routed in accordance with the new global route without regard to those of the nets within the given distance of the new global route. Those of the nets within the given distance of the new global route are re-routed after completion of the detailed re-routing of the net.

17 Claims, 5 Drawing Sheets

TIMING REFINEMENT RE-ROUTING

BACKGROUND

Embodiments of the inventive subject matter generally relate to the field of computers and, more particularly, to electronic design automation.

As the complexity of integrated circuit (IC) designs grows, Engineering Change Orders (ECOs) become more common to satisfy design requirements. An ECO may change logic to accommodate a performance requirement or correct the functionality of a design. ECOs are also submitted to address concerns of manufacturability. An ECO typically occurs at a late stage of the design process, after the design has been fully routed.

Electronic Design Automation tools include a router that routes nets after placement of elements, such as pins. The router routes nets in a 2 stage process that includes global routing and detailed routing. For global routing, the router determines an approximate path for a wire or net through a coarse grid. The router determines a path from tile to tile of the coarse grid to approximate the path. With the approximate paths determined, the router performs detailed routing. In detailed routing, the router determines the actual tracks and vias for the nets in accordance with the approximated paths from global routing.

SUMMARY

Embodiments of the inventive subject matter include automatically improving timing of nets of a fully routed physical design solution. Nets of a netlist are evaluated against a plurality of re-routing criteria to identify the nets that satisfy at least one of the plurality of re-routing criteria. The plurality of re-routing criteria comprises a timing slack threshold, a scenicness threshold, an absolute length threshold, and an average routed segment length threshold. For each of the nets that satisfy at least one of the plurality of re-routing criteria: the net is globally re-routed to determine a new global route for the net; those of the nets that are within a given distance of the new global route are identified; the net is detail re-routed in accordance with the new global route without regard to at least one of those of the nets within the given distance of the new global route; and the at least one of those of the nets within the given distance of the new global route is re-routed after completion of the detailed re-routing of the net.

BRIEF DESCRIPTION OF THE DRAWINGS

The present embodiments may be better understood, and numerous objects, features, and advantages made apparent to those skilled in the art by referencing the accompanying drawings.

FIGS. 1-2 depict example conceptual diagrams of a net re-route selector identifying a target net for re-routing and creating a blast zone.

FIG. 1 depicts a conceptual diagram of the net re-route selector identifying a target net.

FIGS. 3-4 depicts a flowchart of example operations for using thresholds for controlling use of blast zones with re-routing of nets in a fully routed physical design solution.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

A netlist of a fully routed/synthesized physical design solution can be automatically evaluated to identify nets for re-routing to improve the design. Using a net re-route selector module to evaluate the millions of nets in a netlist can lead to design improvements significantly faster than manual inspection of the fully routed design. The net re-route selector module (e.g., implemented as a module of an electronic design automation tool) evaluates a netlist against re-routing critieria. The net selection module selects those nets that satisfy the re-routing criteria. In some cases, the net selection module uses a "blast zone" around a selected net's new/different global route. Use of a blast zone involves the net re-route selector module identifying nets within a given distance of the global route. The net re-route selector module rips up the nets within the blast zone ("blast zone nets") to allow a router perform detail routing for the selected net without congestion and/or obstruction of the blast zone nets. After the selected net is re-routed, the blast zone nets are re-routed.

Figure 1:
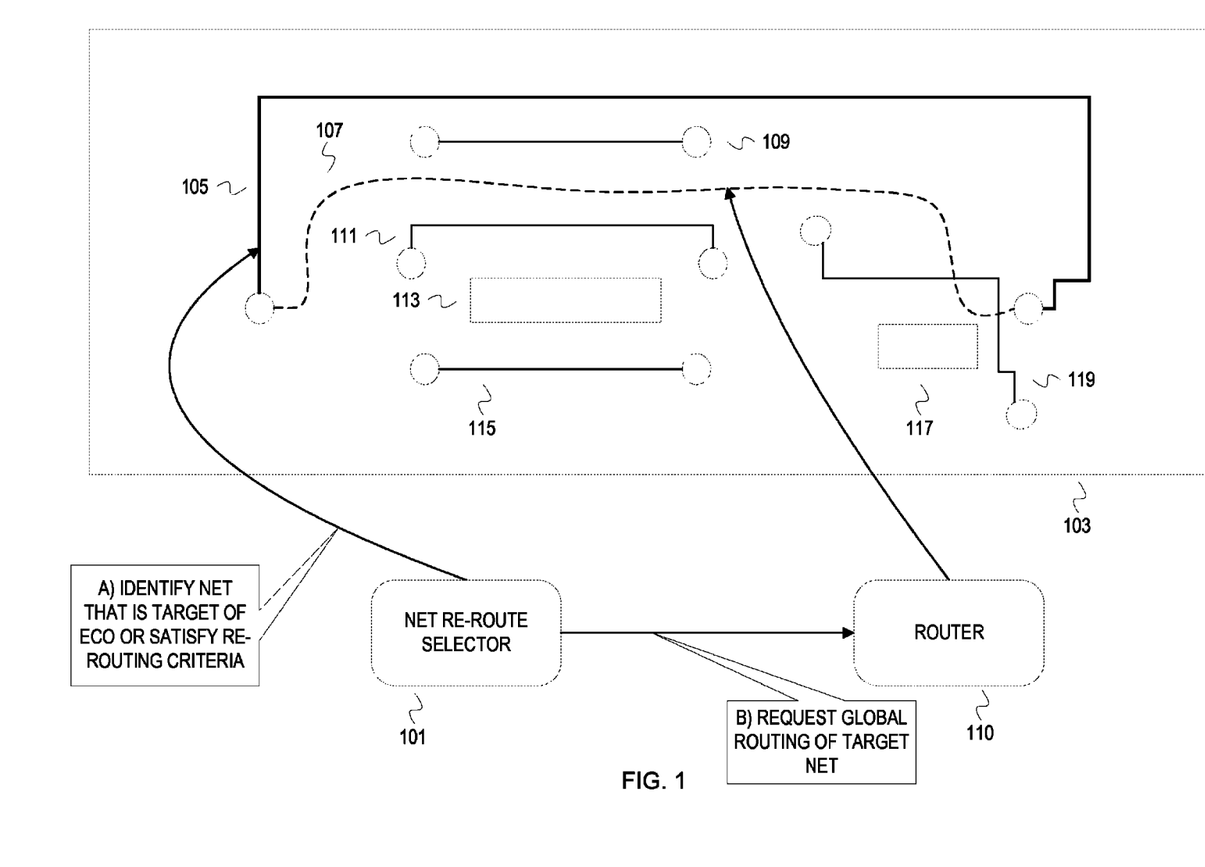
Figure 2:
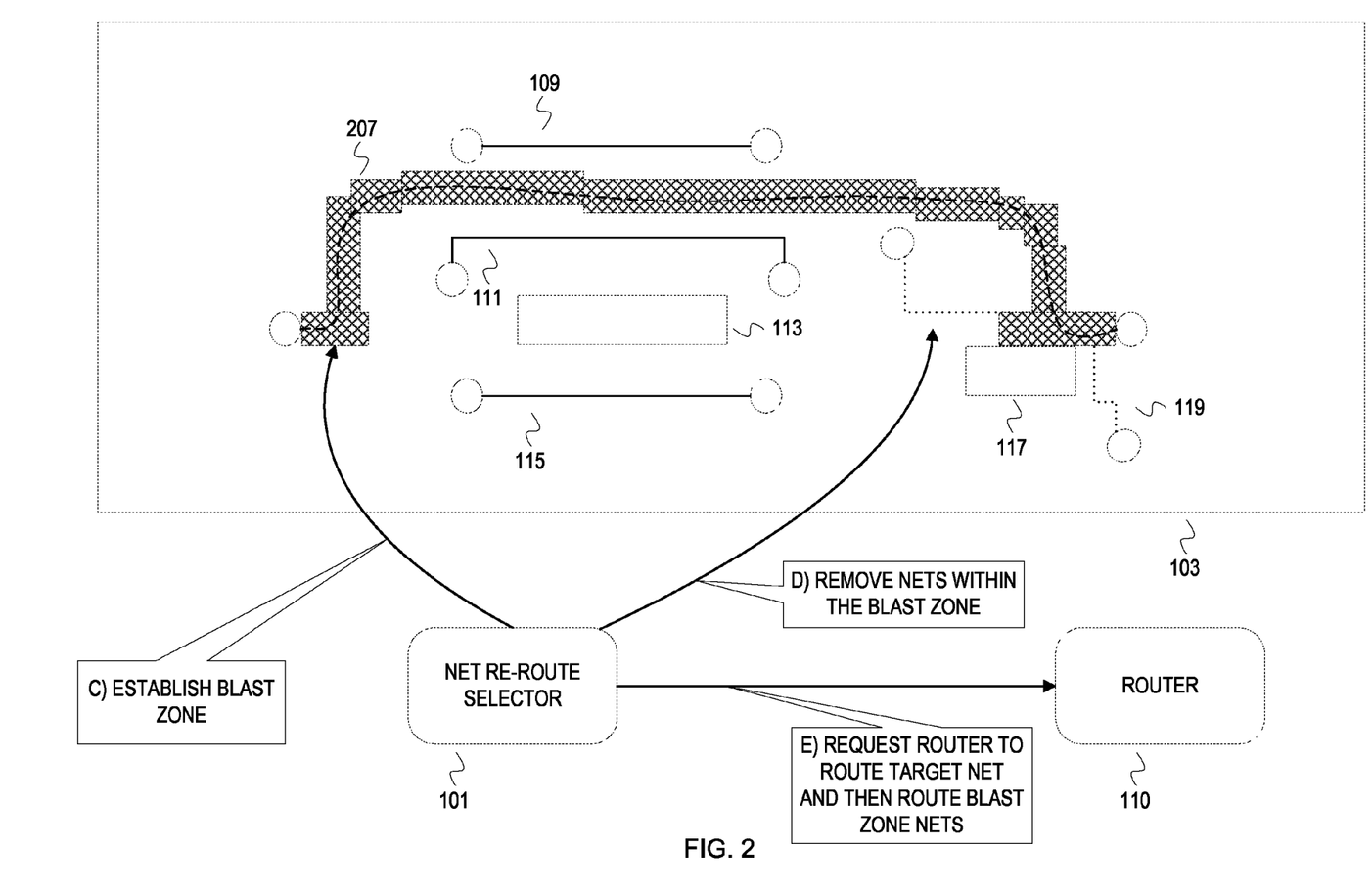
FIG. 2 depicts the continuation of example operations in stages C-E.

FIGS. 1-2 depict example conceptual diagrams of a net re-route selector identifying a target net for re-routing and creating a blast zone. For simplicity, the millions of possible nets and elements are not depicted in FIGS. 1 and 2. FIG. 1 depicts a conceptual diagram of the net re-route selector identifying a target net. In FIG. 1, an integrated circuit design representation 103 comprises several nets and elements (e.g., pins, protective elements, etc.). The several nets include net 105, net 109, net 111, net 115, and net 119. The elements include element 113 and element 117. Example stages A-E depict operations performed by the net re-route selector 101 on the circuit design represented by circuit design representation 103. Embodiments can implement the net re-route selector 101 as part of an electronic design automation (EDA) tool, as a separate program that interacts with an EDA tool, etc.

At state A, the net re-route selector 101 identifies one or more nets as target nets. The net re-route selector 101 identifies nets as target nets in response to at least one of an ECO and automatically evaluating the netlist against re-routing criteria. For example, submission of an ECO may trigger the net re-route selector 101 to evaluate the netlist against the re-routing criteria in order to identify other modifications in addition to those for the ECO. As another example, a designer may run the net re-route selector 101 to generate, implicitly or explicitly, an ECO (i.e., identify and implement changes responsive to evaluating the netlist against the re-routing criteria). Regardless of the particular trigger for this example, the net re-route selector 101 determines that the net 105 satisfies the re-routing criteria, thus identifying the net 105 as a target net. The net 105 is depicted as a scenic net, which leads to the net 105 satisfying the re-routing criteria. Although all elements that led to the route of net 105 are not depicted, the net 111, net 109, element 113, and the net 119 seem to contribute to the depicted route of net 105.

At stage B, the net re-route selector 101 requests global routing of the target net 105 by a router 110. The router 110 creates a new global route 107 for the net 105.

FIG. 2 depicts the continuation of example operations in stages C-E. At stage C, the net re-route selector 101 establishes a blast zone 207 around the new global route. To establish the blast zone, the net re-route selector 101 identifies all nets within a given distance of the new global route. The given distance can be a predefined value set when the net re-route selector is configured, or configured by a designer. The given distance can vary based on attributes of the circuit being designed.

At stage D, the net re-route selector 101 removes the nets that fall within the blast zone. In this example, the net 119 falls within the blast zone. When the net re-route selector 101 removes the net 119, resources associated with the net 119 are released.

At stage E, the net re-route selector 101 requests detailed routing of the target net 105 by the router 110. With the blast zone 207 cleared, the router 110 can take advantage of fewer blockages, and perhaps some of the released resources, when routing the target net 105. The net re-route selector 101 also requests routing of the net 119 by the router 110 after the target net 105 has been re-routed.

FIGS. 1-2 illustrate a single limited example of identifying a small, effective number of nets for re-routing and utilization of a blast zone. A netlist of a fully routed physical design solution can be iteratively evaluated and re-routed to further shrink the set of target nets. And blast zones can be limited to the reduced set of target nets to reduce the impact of the blast zones. Embodiments can make a variety of adjustments (e.g., varying the size of the blast zone and fine tuning the re-routing criteria) to balance expending resources on design revisions against deltas in time improvements.

Figure 3:
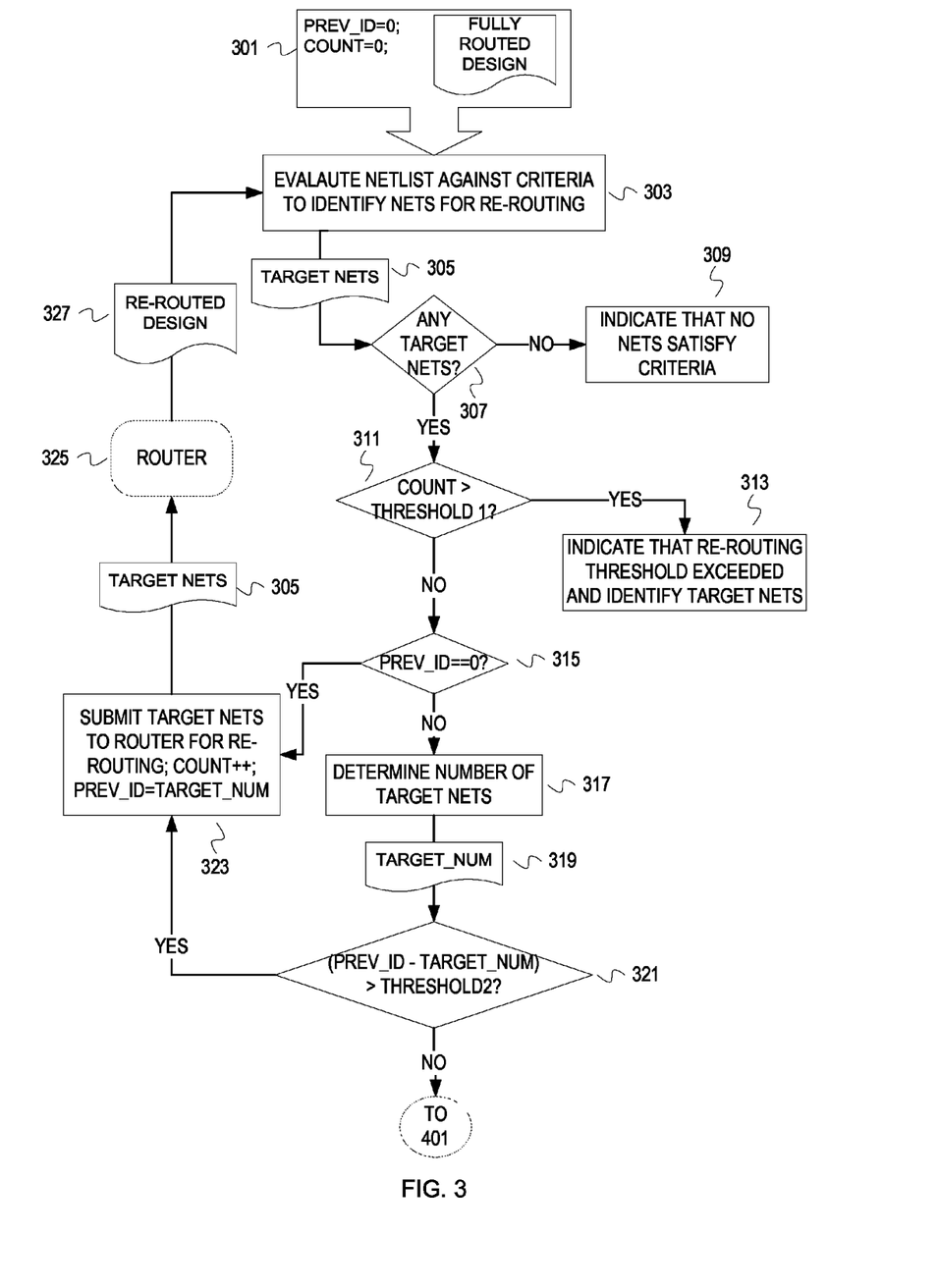
FIG. 3 depicts example operations for identifying target nets for re-routing before using blast zones.
Figure 4:
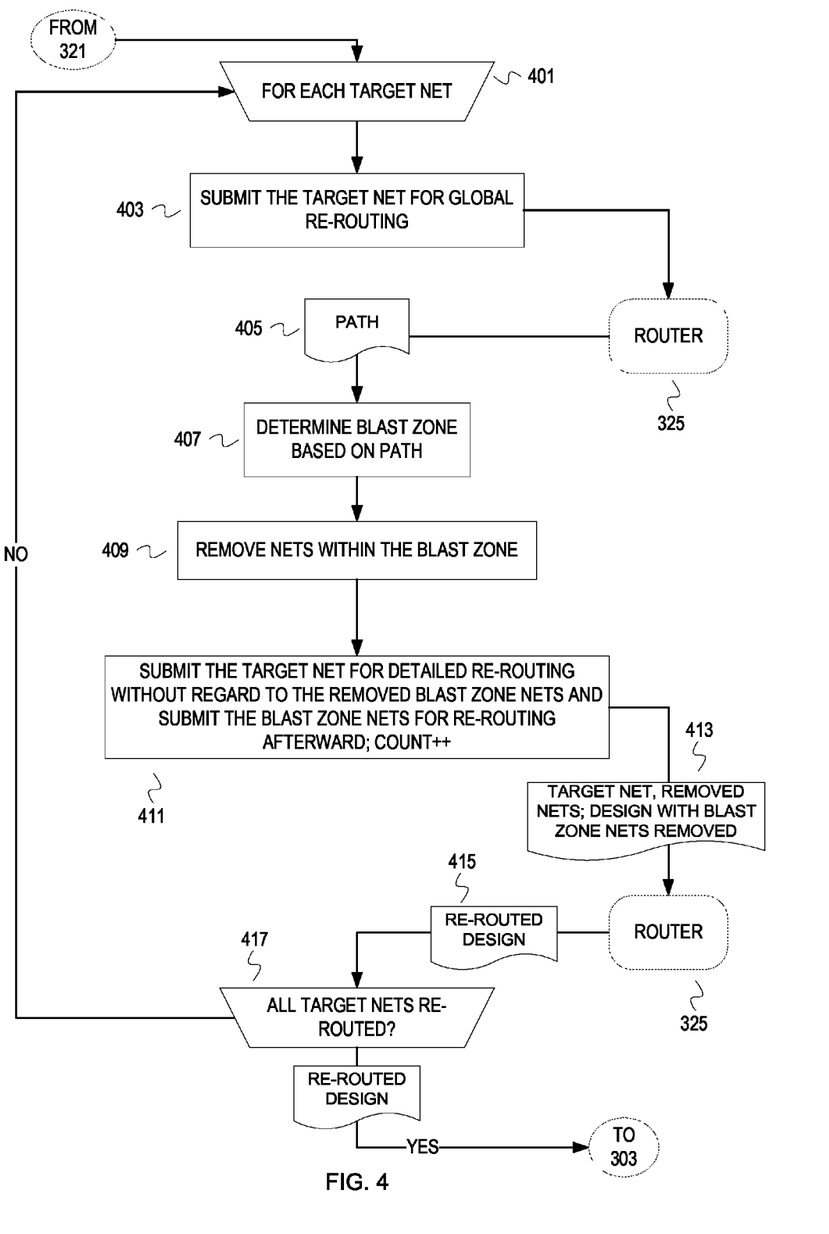
FIG. 4 continues the operations from FIG. 3 when the number of target nets stabilizes as determined at block 321.

FIGS. 3-4 depicts a flowchart of example operations for using thresholds for controlling use of blast zones with re-routing of nets in a fully routed physical design solution. FIG. 3 depicts example operations for identifying target nets for re-routing before using blast zones. The flowchart begins with block 303. A fully routed/synthesized physical design solution ("fully routed design") is input, and variables PREV_ID and COUNT are initialized to 0. At block 303, the netlist of the fully routed design is evaluated against re-routing criteria to identify nets for re-routing. The criteria utilized include a slack threshold, scenicness, an absolute length threshold, and an average routed segment length threshold.

The slack threshold criterion identifies a net with negative slack. Embodiments can define the slack threshold criterion to also be defined with a small positive slack to accommodate a margin of error. For example, a slack threshold can be defined as +5 picoseconds to capture nets with any negative slack, 0 slack, and between 0 and +5 picoseconds of slack.

The scenicness criterion is defined in terms of a ratio of the routed wire length to the ideal steiner-based wire length. The scenicness is computed, if not already, for each net and compared against the scenicness criterion. The scenicness criterion is set to capture nets with higher chances that of timing improvement by straightening out the detailed routing solution.

The absolute length threshold criterion captures nets whose routed wire lengths are longer than the absolute length threshold. Short nets are more likely to have a similar detailed routing solution after re-routing without a timing improvement.

The average routed segment length threshold criterion captures nets that have too many vias in a detailed routing solution (i.e., jig-jagged path). The timing of nets with numerous vias can be improved by removing unnecessary vias. Even though a net with a jig-jagged path may not be a scenic net, the overall shape of the net (i.e., the global routing solution) might be a straight line. The seemingly straight net can take small jogs due to local routing congestion or blockages. To select these nets, the average length of routed segments of a net is calculated. A small value indicates that the net contains relatively numerous jogs. The timing of the jogged path can be improved significantly by taking longer segments at the possible expense of higher scenicness. A reduction in jogs can deliver enough timing improvement to offset the effects of increased scenicness.

Each net in the netlist of the fully routed design is evaluated against the re-routing criteria. Nets that satisfy all of the re-routing criteria are identified as target nets 305. After the identification of the target nets 305, control flows from block 303 to block 307. Embodiments do not necessarily apply the criteria with an AND condition. In other words, embodiments can selectively apply the criteria described above. For example, the a greater number of target nets may be desired. So, criteria can be applied to capture nets that satisfy 2 of the 4 criteria if the target nets, and the fourth as optional (i.e., using an AND logical evaluation for the 2 of the 4 criteria and an OR logical evaluation for the other 2 criteria). As an illustration, a run of the net re-route selector can require nets to satisfy the average routed segment length threshold criterion but not the scenicness criterion. The run will capture nets that are not necessarily scenic. When re-routing, nets with many jogs can be re-routed along the same route without regard for those blockage(s) within the blast zone, thus resulting in fewer vias.

At block 307, it is determined whether there are any target nets. If there are no target nets, then an indication is generated that no nets satisfy the criteria at block 309. If there are target nets, then control flows to block 311.

At block 311, it is determined whether the COUNT exceeds a THRESHOLD1. A designer sets the THRESHOLD1 to a value representing a limit for a number of times to revise the fully routed design. For instance, a designer may determine from experience and/or heuristics that exceeding 200 revisions indicates a problem in the design that requires manual inspection. Embodiments can define other revision regulating thresholds for limiting the number of revisions to a design. A revision regulating threshold may define a minimal decrease in target nets over X revisions to continue revisions. A revision regulating threshold may define a minimal timing improvement to continue revising the design. For this example, if the COUNT exceeds the THRESHOLD1, then control flows to block 313. If the COUNT does not exceed the THRESHOLD1, then control flows to block 315.

At block 313, an indication that a re-routing threshold has been exceeded is generated. In addition, the target nets are identified. For example, the target nets may be supplied to a designer for review/inspection.

At block 315, it is determined whether PREV_ID equals 0, which indicates a first run of the re-routing program. If PREV_ID is equal to 0, then control flows to block 323. If PREV_ID is not equal to 0, then control flows to block 317.

At block 317, a number of target nets (TARGET_NUM) 319 is determined.

At block 321, it is determined whether a difference between PREV_ID and TARGET_NUM exceeds THRESHOLD2. A designer sets the THRESHOLD2 to a value that represents a minimal desired reduction in target nets before employing blast zones. In other words, the THRESHOLD2 is set to continue re-routing without blast zones until the number of target nets stabilizes. If the number of target nets has stabilized without blast zones, then control flows to block 401 of FIG. 4. Otherwise, control flows to block 323.

At block 323, the target nets 305 are submitted to a router 325 for re-routing, both global and detailed re-routing. In addition, COUNT is incremented to reflect an additional re-routing run. And PREV_ID is set to the TARGET_NUM. After re-routing, the re-routed design is evaluated against the re-routing criteria at block 303.

FIG. 4 continues the operations from FIG. 3 when the number of target nets stabilizes as determined at block 321. At block 401, operations for each target net begin. The operations are depicted in blocks 403, 407, 409, and 411. At some point before these operations, the target nets can be ordered. The target nets can be ordered in accordance with a various attributes. In some embodiments, the target nets are ordered in ascending order of time slackness. Thus, the target net with the greatest negative time slack is processed first.

At block 403, the target net is submitted for global re-routing to the router 325. For instance, the router is invoked with the current target net passed as a parameter or by reference. When invoking the router, a parameter to tightly control scenicness of the new global route is set. For example, the router may be invoked with a scenicness parameter that constrains the router to increasing the global routing wire length to 10% beyond the ideal steiner wire length.

At block 407, a blast zone is determined based on the path. One or more areas that encompass the path are determined based on a configured distance. For example, a tool determines one or more rectangular areas that encompass the path up to the configured distance from the path. Embodiments are not limited to rectangular areas, and may employ ellipses, irregular shapes, etc. The router 325 communicates information about the approximate path 405 for the target net. Embodiments can constrain and/or adjust the blast zone in various manners to minimize the impact of the blast zone and/or achieve a desire re-routing of the target net. In some embodiments, the blast zone can be adjusted if it encompasses a too many or too few nets as represented by a threshold number of nets. In some embodiments, the distance that defines the blast zone is decremented after each re-routing run. For example, the distance is reduced 2 microns after each evaluation of the design against the re-routing criteria. In some embodiments, the blast zone grows if the re-routed target net does not satisfy a minimal degree of timing improvement. For example, a timing improvement threshold can be defined for growing a blast zone. After the target net is re-routed, the target net is evaluated to determine whether timing of the target net has improved beyond the timing improvement threshold. This evaluation for timing improvement can be conducted before or after the blast zone nets are re-routed. In addition, the timing of the blast zone nets can be evaluated with the re-routed target net. If the overall timing does not improve beyond the timing improvement threshold (or a separate blast zone timing improvement threshold), then the target net and the blast zone nets are re-routed again. If the target net and blast zone nets are re-routed more than a pre-defined number of times, the target net may be flagged for manual inspection.

At block 409, the nets within the blast zone ("blast zone nets") are removed. For example, the nets are removed from the design and added to a data structure to be passed to the router. In some embodiments, blast zone nets are filtered before being removed. For example, a net with a negative slack that has not been identified as a target net is not removed from the design. As another example, a net with a length beyond a threshold length is not removed from the design to prevent ripping up longer nets that may have good routing and/or to reduce the impact of the blast zone on the overall design. In some embodiments, the nets falling within the blast zone may be marked to disregard rather than removed when the target net is re-routed.

At block 411, the target net and the blast zone nets are submitted to the router 325 for re-routing. The target net is submitted to the router 325 for detailed routing along the approximate path without regard to the removed blast zone nets. The blast zone nets removed from the design (or marked to disregard for re-routing of the target net) are submitted for both global routing and detailed routing after the target net has been routed. In some embodiments, the blast zone nets are routed without global routing. The router 325 is invoked, and the target net, blast zone nets, and design without the blast zone nets 413 are passed by reference or as parameters to the router 325.

At block 417, it is determined if all of the target nets have been re-routed. If not, then control flows back to block 401. If all of the target nets have been re-routed, then control flows to block 303 of FIG. 3 for re-evaluation of the revised fully routed design against the re-routing criteria. In some embodiments, re-routing of the target nets are short circuited if a timing improvement exceeds a short circuit threshold. In some cases, a blast zone will encompass a target net. If the target net has already been re-routed, then it will have been marked or tagged to prevent the tool from ripping up the target net when encompassed within a blast zone afterwards. In some embodiments, the target nets are not ripped up whether or not they have already been re-routed. Embodiments may not consider re-routing of a target net within a blast zone to be re-routing. Thus, the re-routed target net is re-routed again when arrived upon in order for re-routing (not because of being within a blast zone). In some embodiments, the target net is considered re-routed (e.g., tagged) within a run whether or not due to falling within a blast zone.

Those of ordinary skill in the art should understand that entities and operations depicted in the conceptual diagrams of FIGS. 1 and 2 as well as the flowchart of FIGS. 3-4 are examples to aid in understanding the inventive subject matter, and should not be used to limit the scope of the claims. Embodiments can perform additional operations not depicted, fewer than the depicted operations, the operations in a different order, the operations in parallel, etc. For example, operations may proceed directly from block 303 to 401. Additional operations to evaluated re-routed target nets can be performed between those operations depicted in blocks 411 and 417. Additional operations to filter blast zone nets can be performed before removal of blast zone nets as depicted in block 409.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
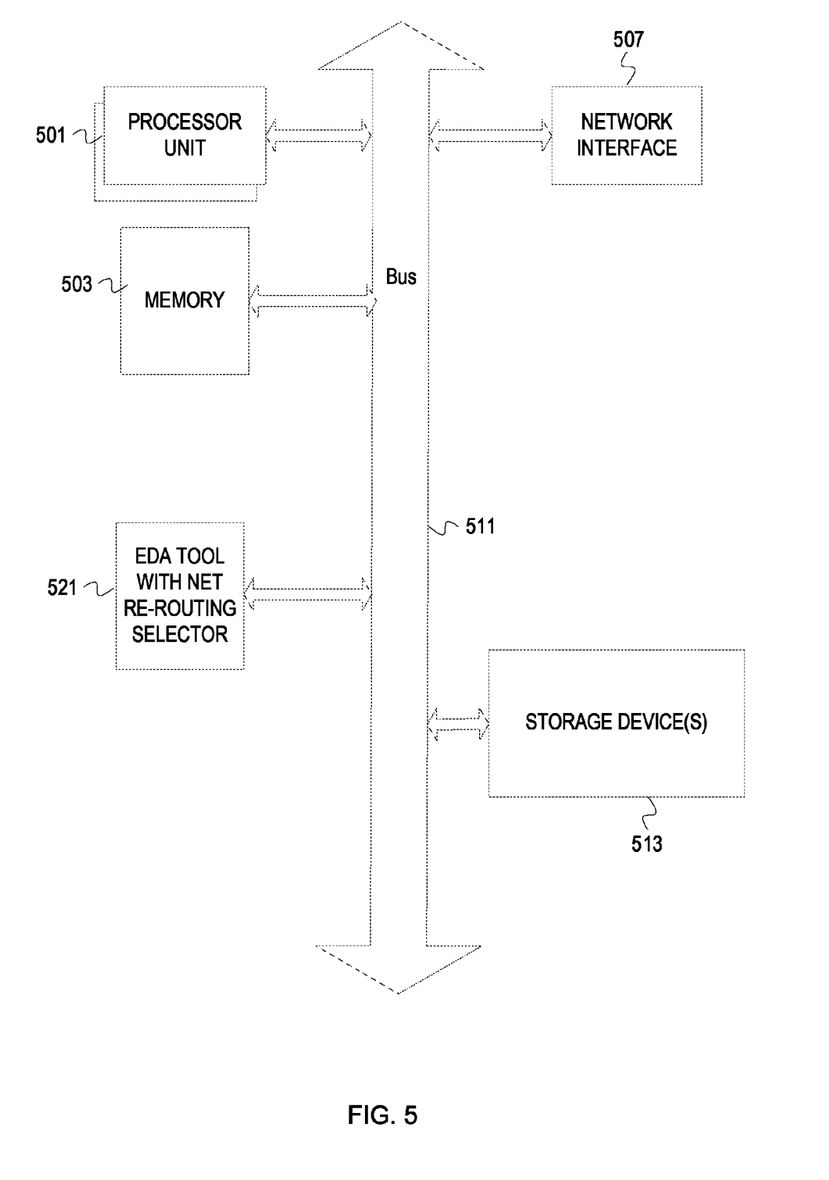
FIG. 5 depicts an example computer system with an EDA tool that has a net re-routing selector.

FIG. 5 depicts an example computer system with an EDA tool that has a net re-routing selector. A computer system includes a processor unit 501 (possibly including multiple processors, multiple cores, multiple nodes, and/or implementing multi-threading, etc.). The computer system includes memory 503. The memory 503 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 511 (e.g., PCI, ISA, PCI-Express, HyperTransport®, InfiniBand®, NuBus, etc.), a network interface 507 (e.g., an ATM interface, an Ethernet interface, a Frame Relay interface, SONET interface, wireless interface, etc.), and a storage device(s) 513 (e.g., optical storage, magnetic storage, etc.). The system also includes an EDA tool 521, which has a net re-routing selector. With the net re-routing selector, the EDA tool 521 evaluates nets of a fully routed physical design solution, and identifies those nets that satisfy re-routing criteria as target nets. The target nets are re-routed with or without blast zones. Some or all of the functionality may be implemented with program code embodied in one or more of the memory 503 and the storage device(s) 513. Any one of these functionalities may be partially (or entirely) implemented in hardware and/or on the processing unit 501. For example, the functionality may be implemented with an application specific integrated circuit, in logic implemented in the processing unit 501, in a coprocessor on a peripheral device or card, etc. Further, realizations may include fewer or additional components not illustrated in FIG. 5 (e.g., video cards, audio cards, additional network interfaces, peripheral devices, etc.). The processor unit 501, the storage device(s) 513, and the network interface 507 are coupled to the bus 51. Although illustrated as being coupled to the bus 51, the memory 503 may be coupled to the processor unit 501.

While the embodiments are described with reference to various implementations and exploitations, it will be understood that these embodiments are illustrative and that the scope of the inventive subject matter is not limited to them. In general, techniques for identifying nets that satisfy re-routing criteria and re-routing those nets as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method of automatically improving timing of nets of a fully routed physical design solution, the method comprising:
evaluating nets of a netlist against a plurality of re-routing criteria to identify the nets that satisfy at least one of the plurality of re-routing criteria, wherein the plurality of re-routing criteria comprises a timing slack threshold, a scenicness threshold, an absolute length threshold, and an average routed segment length threshold;
for each of the nets that satisfy at least one of the plurality of re-routing criteria, global re-routing the net to determine a new global route for the net;
identifying those of the nets that are within the new global route or within a given distance of the new global route;
at least one of, removing the at least one of those of the nets within the new global route or within the given distance of the new global route from the fully routed physical design solution, and marking the at least one of those of the nets within the given distance from the new global route for disregarding when the net is re-routed;
detailed re-routing the net in accordance with the new global route without regard to at least one of those of the nets within the new global route or within the given distance of the new global route, wherein said detailed re-routing the net in accordance with the new global route without regard to at least one of those of the nets within the new global route or within the given distance of the new global route comprises,
detailed re-routing the net based, at least in part, on the at least one of those nets within the new global route or within the given distance of the new global route being removed or being marked for disregarding; and
re-routing the at least one of those of the nets within the new global route or within the given distance of the new global route after completion of the detailed re-routing of the net.

2. The method of claim 1 further comprising, after said re-routing of the at least one of those nets within the new global route or within the given distance of the new global route, re-evaluating the nets against the plurality of re-routing criteria.

3. The method of claim 1, wherein said global re-routing of the net to determine the new global route for the net is in accordance with a tight scenicness parameter.

4. The method of claim 3, wherein the tight scenicness parameter corresponds to a percentage of an ideal steiner-based wire length for the net.

5. The method of claim 1 further comprising ordering the nets that satisfy the at least one of the plurality of re-routing criteria after said evaluating the nets of the netlist against the plurality of re-routing criteria, wherein the nets that satisfy the re-routing criteria are handled in accordance with the order.

6. The method of claim 5, wherein said ordering the nets that satisfy the at least one of the plurality of re-routing criteria comprises ordering the nets based on time slackness of the nets that satisfy the at least one of the plurality of re-routing criteria.

7. The method of claim 1 further comprising:
determining that a timing improvement of the net after said detailed re-routing of the net in accordance with the new global route is insufficient;
increasing the given distance;
identifying a set of nets that are within the increased given distance from the new global route;
detailed re-routing the net in accordance with the new global route without regard to the set of nets within the increased given distance of the new global route; and
re-routing the set of nets within the increased global distance of the new global route after completion of the detailed re-routing of the net.

8. The method of claim 1, wherein said evaluating the nets of the netlist against the plurality of re-routing criteria requires all of the plurality of re-routing criteria to be satisfied.

9. A computer program product for automatically improving timing of nets of a fully routed physical design solution, the computer program product comprising:
a computer readable storage medium having computer usable program code embodied therewith, the computer usable program code comprising a computer usable program code configured to:
evaluate nets of a netlist against a plurality of re-routing criteria to identify the nets that satisfy at least one of the plurality of re-routing criteria, wherein the plurality of re-routing criteria comprises a timing slack threshold, a scenicness threshold, an absolute length threshold, and an average routed segment length threshold;
for each of the nets that satisfy at least one of the plurality of re-routing criteria, request global re-route of the net to determine a new global route for the net;
identify those of the nets that are within the new global route or within a given distance of the new global route;
at least one of, removing the at least one of those of the nets within the new global route or within the given distance of the new global route from the fully routed physical design solution, and marking the at least one of those of the nets within the given distance from the new global route for disregarding when the net is re-routed;
request detailed re-routing of the net in accordance with the new global route without regard to at least one of those of the nets within the given distance of the new global route, wherein the computer usable program code configured to request detailed re-routing of the net in accordance with the new global route without regard to at least one of those of the nets within the new global route or within the given distance of the new global route comprises the computer usable program code configured to,
request detailed re-routing of the net based, at least in part, on the at least one of those nets within the new global route or within the given distance of the new global route being removed or being marked for disregarding; and
request re-routing of the at least one of those of the nets within the new global route or within the given distance of the new global route after completion of the detailed re-routing of the net.

10. The computer program product of claim 9, wherein the computer usable program code is further configured to re-evaluate the nets against the plurality of re-routing criteria after re-routing of the at least one of those nets within the new global route or within the given distance of the new global route.

11. The computer program product of claim 9, wherein the computer usable program code configured to request global re-routing of the net to determine the new global route for the net comprises the computer usable program code being configured to request global re-routing of the net in accordance with a tight scenicness parameter.

12. The computer program product of claim 11, wherein the tight scenicness parameter corresponds to a percentage of an ideal steiner-based wire length for the net.

13. The computer program product of claim 9 further comprising computer usable program code configured to order the nets that satisfy the at least one of the plurality of re-routing criteria after evaluation of the nets of the netlist against the plurality of re-routing criteria, wherein the nets that satisfy the re-routing criteria are handled in accordance with the order.

14. The computer program product of claim 13, wherein computer usable program code configured to order the nets is configured to order the nets based on time slackness of the nets that satisfy the at least one of the plurality of re-routing criteria.

15. The computer program product of claim 9 further comprising computer usable program code configured to:
determine that a timing improvement of the net after detailed re-routing of the net in accordance with the new global route is insufficient;
increasing the given distance;
identify a set of nets that are within the increased given distance from the new global route;
request detailed re-routing of the net in accordance with the new global route without regard to the set of nets within the increased given distance of the new global route; and
request re-routing of the set of nets within the increased global distance of the new global route after completion of the detailed re-routing of the net.

16. An apparatus comprising:
a processor; and
a non-transitory computer readable storage medium having computer usable program code embodied therewith, the computer usable program code comprising a computer usable program code executable by the processor to cause the apparatus to,
evaluate nets of a netlist against a plurality of re-routing criteria to identify the nets that satisfy at least one of the plurality of re-routing criteria, wherein the plurality of re-routing criteria comprises a timing slack threshold, a scenicness threshold, an absolute length threshold, and an average routed segment length threshold;
for each of the nets that satisfy at least one of the plurality of re-routing criteria, request global re-route of the net to determine a new global route for the net;
identify those of the nets that are within the new global route or within a given distance of the new global route;
at least one of, removing the at least one of those of the nets within the new global route or within the given distance of the new global route from the fully routed physical design solution, and marking the at least one of those of the nets within the given distance from the new global route for disregarding when the net is re-routed;
request detailed re-routing of the net in accordance with the new global route without regard to at least one of those of the nets within the given distance of the new global route, wherein the computer usable program code configured to request detailed re-routing of the net in accordance with the new global route without regard to at least one of those of the nets within the new global route or within the given distance of the new global route comprises the computer usable program code configured to,
request detailed re-routing of the net based, at least in part, on the at least one of those nets within the new global route or within the given distance of the new global route being removed or being marked for disregarding; and
request re-routing of the at least one of those of the nets within the new global route or within the given distance of the new global route after completion of the detailed re-routing of the net.

17. The apparatus of claim 16, wherein the computer readable storage medium also has computer usable program code embodying an electronic automation design tool.

* * * * *